(12) United States Patent
Luo et al.

(10) Patent No.: US 11,635,409 B2
(45) Date of Patent: Apr. 25, 2023

(54) MULTI-MATERIAL INSPECTION SYSTEM AND VELOCITY MEASUREMENT METHOD OF CRITICALLY REFRACTED LONGITUDINAL WAVE BASED ON SINGLE-ANGLE WEDGES

(71) Applicant: DALIAN UNIVERSITY OF TECHNOLOGY, Dalian (CN)

(72) Inventors: Zhongbing Luo, Dalian (CN); Li Lin, Dalian (CN); Song Zhang, Dalian (CN); Hong Wang, Dalian (CN); Shijie Jin, Dalian (CN); Zhiyuan Ma, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/742,237

(22) Filed: May 11, 2022

(65) Prior Publication Data

US 2022/0268739 A1  Aug. 25, 2022

Related U.S. Application Data

(63) Continuation of application No. PCT/CN2021/074278, filed on Jan. 29, 2021.

(30) Foreign Application Priority Data

Jan. 16, 2021 (CN) .......................... 202110058134.9

(51) Int. Cl.
*G01N 29/07* (2006.01)
*G01N 29/06* (2006.01)

(52) U.S. Cl.
CPC ......... *G01N 29/07* (2013.01); *G01N 29/0645* (2013.01); *G01N 2291/011* (2013.01);
(Continued)

(58) Field of Classification Search
USPC .......................................................... 73/597
See application file for complete search history.

(56) References Cited

U.S. PATENT DOCUMENTS

8,438,928 B2 * 5/2013 Frederick ............. G01N 29/262
  73/644
9,091,638 B2 * 7/2015 Frederick ............... G01N 29/07
9,863,826 B2 * 1/2018 Xu ..................... G01N 29/4472

FOREIGN PATENT DOCUMENTS

CN    103017953 A    4/2013
CN    105044213 A    11/2015
(Continued)

*Primary Examiner* — Jacques M Saint Surin

(57) ABSTRACT

A multi-material inspection system and velocity measurement method of critically refracted longitudinal wave based on single-angle wedges belong to the field of nondestructive testing of high-end equipment. The method includes the following steps: designing a transmitting wedge and a receiving wedge with the same inclination angle, and building phased array ultrasonic-based inspection systems of critically refracted longitudinal wave; estimating a longitudinal wave velocity range of a material to be tested, calculating and optimizing a phased array ultrasonic delay law, and building a relation between a longitudinal wave velocity and an amplitude of critically refracted longitudinal wave; reading and interpolating the arrival time of a received signal, and calculating a longitudinal wave velocity of the material to be tested; determining an optimal delay law, and exciting and receiving a critically refracted longitudinal wave.

1 Claim, 9 Drawing Sheets

(52) U.S. Cl.
CPC .............. *G01N 2291/023* (2013.01); *G01N 2291/0289* (2013.01); *G01N 2291/102* (2013.01)

(56) References Cited

FOREIGN PATENT DOCUMENTS

| | | | | |
|---|---|---|---|---|
| CN | 105158339 | * | 12/2015 | |
| CN | 105319271 A | | 2/2016 | |
| CN | 105606705 A | | 5/2016 | |
| CN | 109341912 A | | 2/2019 | |
| CN | 111337171 | * | 6/2020 | ............ G01L 1/255 |
| WO | WO2010129701 A2 | | 11/2010 | |

* cited by examiner

MULTI-MATERIAL INSPECTION SYSTEM AND VELOCITY MEASUREMENT METHOD OF CRITICALLY REFRACTED LONGITUDINAL WAVE BASED ON SINGLE-ANGLE WEDGES

CROSS-REFERENCE TO RELATED APPLICATIONS

The application claims priority to Chinese patent application No. 202110058134.9 filed on Jan. 16, 2021, the entire contents of which are incorporated herein by reference.

TECHNICAL FIELD

A multi-material inspection system and velocity measurement method of critically refracted longitudinal wave based on single-angle wedges belong to the field of nondestructive testing of high-end equipment.

BACKGROUND

Plate structures are widely applied to high-end equipment in key fields such as aerospace, navigation, and automobiles. Due to the limitation of the existing technologies, some defects and damages are inevitably resulted in plate structures during the manufacturing and service process. For example, delaminations are inevitably introduced in carbon fibre reinforced plastics laminates prepared by hot-pressing, and folding defects are commonly encountered in rolled titanium alloy plates, which seriously reduce the bearing performance and reliability in operation of high-end equipment parts. Therefore, if the defects and damages in the plate structures could be effectively inspected and evaluated, disasters can be warned in early stage, which is of great significance to the reliability of high-end equipment.

Critically refracted longitudinal wave is a longitudinal wave incident at the first critical angle, parallel to the surface of a material and propagated along subsurface. It is widely used in residual stress measurement, surface/subsurface defect inspection, and so on. Existing studies show that the effective excitation of critically refracted longitudinal wave is relatively difficult and requires a strict incident angle. At present, the main solution is to design a wedge with an inclination angle of the first critical angle according to the longitudinal wave velocity of the inspected material, so as to realize the excitation and reception. This method needs to design wedges with different inclination angles for different materials. For the anisotropy of ultrasonic velocity or the change of ultrasonic velocity with time, multiple wedges not only have poor adaptability, increase the inspection cost, but also easily change the coupling state during the wedge replacement process, which bring a lot of inconveniences to quantitative inspection and characterization and cannot meet the urgent needs in manufacturing and service of high-end equipment.

The excitation method based on phased array ultrasonic of critically refracted longitudinal wave provides a solution for this problem. An appropriate delay law is designed to control the deflection of waves, ultrasonic waves can then be incident into a material at a first critical angle, and a single wedge can meet the situations of various materials and ultrasonic velocity changes, without depending on thickness information of a sample, which can effectively solve the in-plane velocity measurement problems of plate-like structures, significantly improve detection efficiency and reliability and reduce detection costs, and are of great significance to the development of high-quality detection and characterization technology for high-end equipment.

SUMMARY

The present invention proposes a multi-material inspection system and velocity measurement method of critically refracted longitudinal wave based on single-angle wedges. By building a phased array ultrasonic transmitting and receiving inspection system, single-angle wedges can be used to detect critically refracted longitudinal wave under the condition of various materials or ultrasonic velocity changes, so as to accurately calculate the longitudinal wave velocity of a material.

The technical solution adopted by the present invention is:

A multi-material inspection system and velocity measurement method of critically refracted longitudinal wave based on single-angle wedges, a transmitting wedge and a receiving wedge with the same inclination angle are designed, and a phased array ultrasonic-based inspection system of critically refracted longitudinal wave is built:

(1) Design of a Transmitting Wedge and a Receiving Wedge with a Single Angle a range of longitudinal wave velocity of a material, $v_w$, to be tested is estimated, a material is selected for the wedges, and the longitudinal wave velocity of the wedges, $v_w$, is required to satisfy $v_w < v_m$; a first critical angle $\alpha_I$ range corresponding to critically refracted longitudinal wave is calculated on the basis of the Snell law, and the formula is as follows:

$$\alpha_I = \sin^{-1}\left(\frac{v_w}{v_m}\right) \qquad (1)$$

a certain angle within the $\alpha_I$ range is selected as the inclination angle $\theta_w$ of the wedges; a first array element center height of the wedges is determined according to an ultrasonic attenuation coefficient of the selected material for the wedges; the size of the wedges is determined according to the size of phased array ultrasonic probes, an ultrasonic absorption layer is arranged between the two wedges to ensure that the transmitted and received ultrasonic signals do not interfere with each other, the wedges are placed on the surface of the material to be tested, and the coupling stability between the two is ensured with the help of a coupling agent;

(2) Building of Phased Array Ultrasonic-Based Inspection System of Critically Refracted Longitudinal Wave a phased array ultrasonic-based transmitting and receiving inspection system of critically refracted longitudinal wave is built with the wedges, specifically including: an M2M MultiX++ phased array ultrasonic system, a computer and a pair of linear array phased array ultrasonic probes; the computer is used to control the inspection system and record critically refracted longitudinal wave signal.

A multi-material inspection system and velocity measurement method of critically refracted longitudinal wave based on single-angle wedges: calculating and optimizing a phased array ultrasonic law, reading the arrival time of a received signal and performing interpolation, and calculating a critically refracted longitudinal wave velocity of a material; including the following steps:

(1) Preliminarily Calculating a Phased Array Ultrasonic Delay Law preliminarily selecting a number of array elements in an aperture n according to the ultrasonic attenuation coefficient of the wedges, giving a longitudinal wave velocity $v_m$ value, calculating a corresponding first critical angle $\alpha_I$ by formula (1), and calculating a phased array ultrasonic incident deflection angle $\theta$ by formula (2) according to the angle of the wedges:

$$\theta = \alpha_I - \theta_w \quad (2)$$

then, calculating a delay law of the phased array ultrasonic transmitting probe by formula (3):

$$\begin{cases} t_i = \dfrac{(i-I) \times P \times \sin\theta}{V_w} & \theta > 0 \\ t_i = \dfrac{(J-i) \times P \times \sin(-\theta)}{V_w} & \theta < 0 \end{cases} \quad (3)$$

where i is a serial number of any aperture array element, I is a serial number of an initial aperture array element, J is a serial number of a final aperture array element, I≤i≤J≤n (i, I, J, and n are all positive integers), t is a delay time of the i-th array element, and P is a spacing between array elements;

(2) Optimizing the Calculated Delay Law selecting a certain value of 5% to 10% in the longitudinal wave velocity range of the material to be tested as a step, setting the longitudinal wave velocity $v_m$ of the material to be tested in sequence from low to high in the phased array ultrasonic inspection system, and exciting and receiving a critically refracted longitudinal wave according to the calculated delay law of the transmitting probe when the receiving probe is not delayed; adjusting a gain of instruments and fixing the gain to a certain value to ensure that the maximum amplitude in the received signals is not less than 80% of the full screen and does not exceed the full screen; building a relation curve between longitudinal wave velocities $v_m$ of the material and amplitudes A of critically refracted longitudinal waves, fitting and determining a $v_m$ value corresponding to the maximum A value;

setting different numbers of aperture array elements n, calculating a delay law of the transmitting probe as described above, and exciting and receiving a critically refracted longitudinal wave when the receiving probe is not delayed, to obtain a relation curve between the numbers of aperture array elements n of the transmitting probe and the amplitudes A of the critically refracted longitudinal waves; selecting a number of array elements in an aperture n according to the quality of received signals, adjusting the gain of instruments, and determining an optimized delay law to ensure that the amplitude of received signals is not less than 50% of the full screen, and the signal-to-noise ratio is not less than 12 dB;

(3) Reading and Interpolating the Arrival Time of a Received Signal exciting and receiving a critically refracted longitudinal wave on the basis of the optimized calculated delay law, and recording A scan and B scan signals in the computer at a sampling frequency of not less than 50 MHz; performing linear interpolation on the A scan signal corresponding to each array element, to ensure that the sampling frequency is not less than 500 MHz;

(4) Calculating the Longitudinal Wave Velocity of the Material to be Tested calculating a delay time $t_{ij}$ between two array elements in the aperture used by the receiving probe by reading and interpolating the arrival time of a received signal, and calculating an angle $\Delta\theta$ between the critically refracted longitudinal wave and the plane of phased array ultrasonic array elements in the B scan in step (5) by formula (4):

$$\Delta\theta = \sin^{-1}\left(\dfrac{t_{ij} \times v_w}{(j-i) \times P}\right) \quad (4)$$

calculating the longitudinal wave velocity $v_m$ of the material to be tested according to the solved $\Delta\theta$ by formula (5):

$$v_m = \dfrac{v_w}{\sin(\theta_w - \Delta\theta)} \quad (5)$$

(5) Calculating an Optimal Delay Law on the basis of the calculated longitudinal wave velocity $v_m$ of the material to be tested, further repeating the preliminary calculation of the phased array ultrasonic delay law, and calculating the optimal delay law, thereby realizing high-quality excitation and reception of critically refracted longitudinal wave based on single-angle wedges on the material to be tested, to inspect defects and evaluate damages.

The beneficial effects of the present invention are: in the multi-material inspection system and velocity measurement method of critically refracted longitudinal wave based on single-angle wedges: a transmitting wedge and a receiving wedge with the same inclination angle are designed, and phased array ultrasonic-based inspection system of critically refracted longitudinal wave are built: a longitudinal wave velocity range of a material to be tested is estimated, a phased array ultrasonic delay law is calculated and optimized, and a relation between a longitudinal wave velocity and an amplitude of critically refracted longitudinal wave is built; the arrival time of a received signal is read and interpolated, and a longitudinal wave velocity of the material to be tested is calculated; an optimal delay law is determined, and A critically refracted longitudinal wave is excited and received. By building a phased array ultrasonic transmitting-receiving inspection system, single-angle wedges can be used to detect critically refracted longitudinal wave under the condition of various materials or ultrasonic velocity changes, without depending on thickness information, which can effectively solve in-plane ultrasonic velocity measurement problems of plate-like structures, significantly improve inspection efficiency and reliability and reduce inspection costs, and are of great significance to the development of inspection and characterization technology for high-end equipment.

DETAILED DESCRIPTION OF THE EXAMPLES

Step 1 Design of a Transmitting Ultrasonic Wedge and a Receiving Ultrasonic Wedge with a Single Angle Taking a CSK-IA standard test block (carbon steel) as a sample, its longitudinal wave velocity $v_m$ is estimated as 4000 m/s~10000 m/s. According to the requirement of $v_w < v_m$, plexiglass with a longitudinal wave velocity of 2730 m/s is selected as the material used for the wedges. The first critical angle $\alpha_I$ range corresponding to critically refracted longitudinal wave is calculated according to formula (1), and the result is 15.4° to 43.0°.

$$\begin{cases} \alpha_I = \sin^{-1}\left(\frac{v_w}{v_m}\right) = \sin^{-1}\left(\frac{2730}{4000}\right) = 43.0° \\ \alpha_I = \sin^{-1}\left(\frac{v_w}{v_m}\right) = \sin^{-1}\left(\frac{2730}{10000}\right) = 15.4° \end{cases} \quad (1)$$

Figure 1:
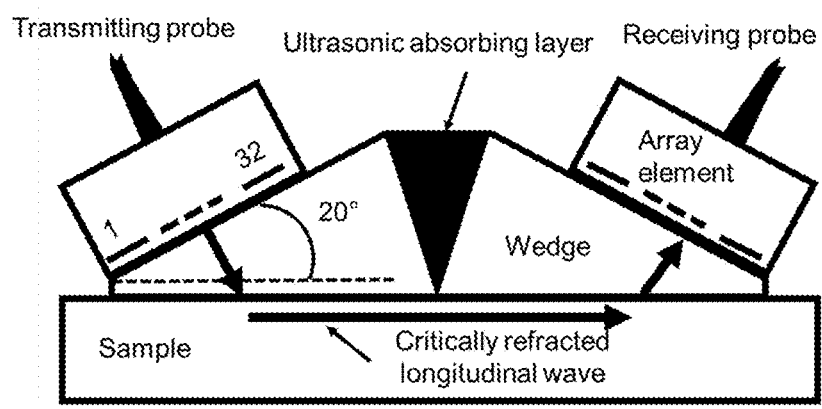
FIG. 1 is a schematic diagram of a phased array ultrasonic-based inspection wedge of critically refracted longitudinal wave.
Figure 2:
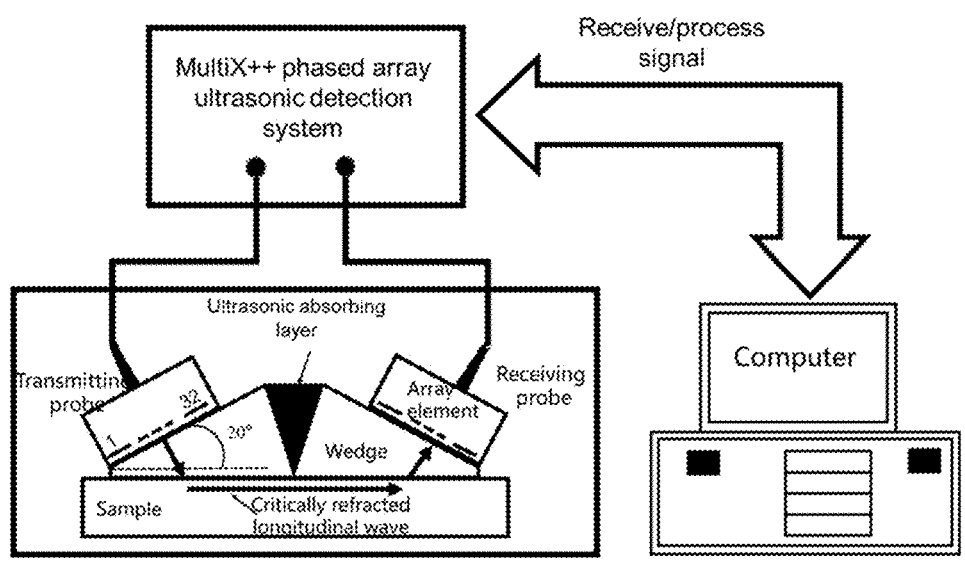
FIG. 2 is a schematic diagram of a phased array ultrasonic-based inspection system of critically refracted longitudinal wave.

20° is selected as the inclination angle $\theta_w$ of the wedges. A first array element center height of the wedges is determined to be 4 mm according to the ultrasonic attenuation coefficient 0.20 dB/mm measured by a pulse reflection method. It is determined according to the size of the selected phased array ultrasonic probe that the wedges have a length of 56 mm and a width of 37 mm, and the height of the maximum point is 12 mm. The wedges are integrated with an ultrasonic absorption layer, as shown in FIG. 1, to ensure that the transmitted and received ultrasonic signals do not interfere with each other. The wedges are placed on the surface of the CS K-IA standard test block, the incident surface is parallel to the thickness direction of the test block, and the coupling stability between the two wedges is ensured with the help of machine oil;

Step 2 Building of Phased Array Ultrasonic-Based Inspection System of Critically Refracted Longitudinal Wave A phased array ultrasonic-based transmitting-receiving inspection system of critically refracted longitudinal wave is built with the wedges designed in step 1, as shown in FIG. 2, specifically including: an M2M MultiX++ phased array ultrasonic host, a computer and a pair of linear array phased array ultrasonic probes; the computer is used to control the inspection systems and record critically refracted longitudinal wave signal.

Step 3 Preliminary Calculation of a Phased Array Ultrasonic Delay Law

The number of array elements in an aperture n is preliminarily selected to be 6 according to the ultrasonic attenuation coefficient of the wedges in step 1. It can be known from step 1 that the first critical angle $\alpha_I$ corresponding to the ultrasonic velocity value of 4000 m/s is 43.0°. A phased array ultrasonic incident deflection angle 9 is calculated by formula (2):

$$\theta = \alpha_I - \theta_w = 43.0° - 20° = 23.0° \quad (2)$$

Then, a delay law of the phased array ultrasonic transmitting probe is calculated. Taking the delay time $t_6$ of the sixth array element as an example, the calculation method is as shown in formula (3), and the delay time obtained is 430 ns.

$$t_6 = \frac{(i-1) \times P \times \sin\theta}{V_w} = \frac{(6-1) \times 6 \times 10^{-4} \times \sin 23.0°}{2730} = 430 \text{ ns} \quad (3)$$

Figure 3:
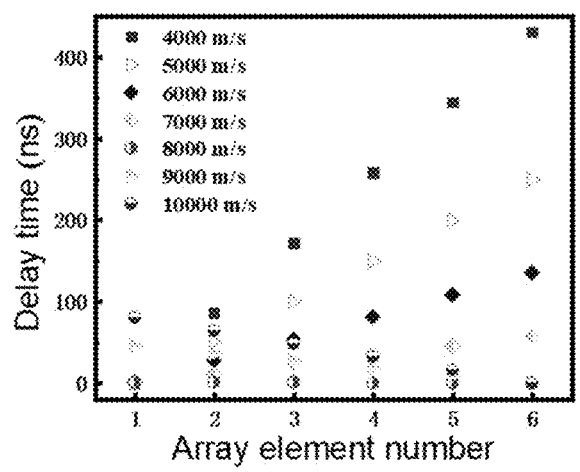
FIG. 3 shows delay time when the number of array elements in an aperture of a phased array ultrasonic transmitting probe is 6, under different longitudinal wave velocity setting values.

Similarly, the delay time of other array elements can be calculated, as shown in FIG. 3.

Step 4 Optimization of the Calculated Delay Law

Figure 4:
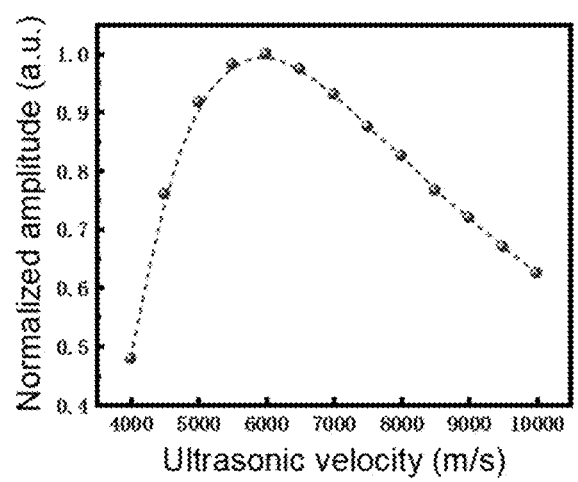
FIG. 4 is a graph showing the relationship between velocity setting values of phased array ultrasonic longitudinal waves and amplitudes of critically refracted longitudinal waves.

According to the estimated ultrasonic velocity range in step 1, the longitudinal wave velocity $v_m$ of the material to be tested is set with a step of 500 m/s in sequence from low to high in the operation process of the phased array ultrasonic-based inspection system shown in FIG. 2: 4000 m/s, 4500 m/s, 5000 m/s, 5500 m/s, 6000 m/s, 6500 m/s, 7000 m/s, 7500 m/s, 8000 m/s, 8500 m/s, 9000 m/s, 9500 m/s, 10000 m/s. According to the delay law of the transmitting probe calculated in step (3), as shown in FIG. 3, A critically refracted longitudinal wave is excited and received when the receiving probe is not delayed. A gain of instruments is adjusted to be 67 dB, and the maximum amplitude in the received signals is 93% of the full screen at this time. A relation curve between longitudinal wave velocities $v_m$ of the material and amplitudes A of critically refracted longitudinal waves is built, as shown in FIG. 4, and the velocity corresponding to the maximum A value is determined to be 6000 m/s.

Figure 5:
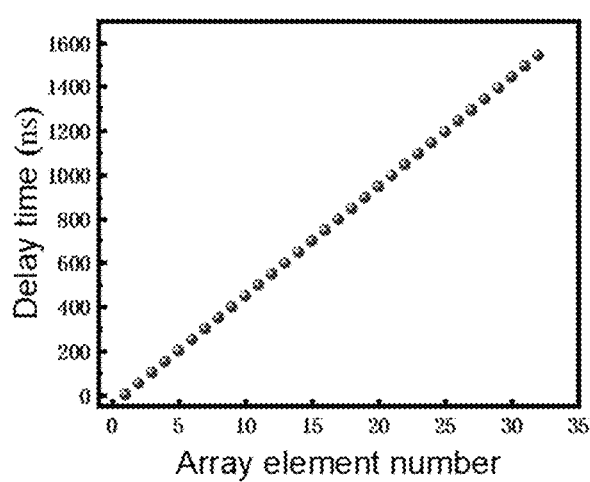
FIG. 5 shows delay time when the number of array elements in an aperture of the phased array ultrasonic transmitting probe is 32 and the longitudinal wave velocity setting value is 5000 m/s.
Figure 6:
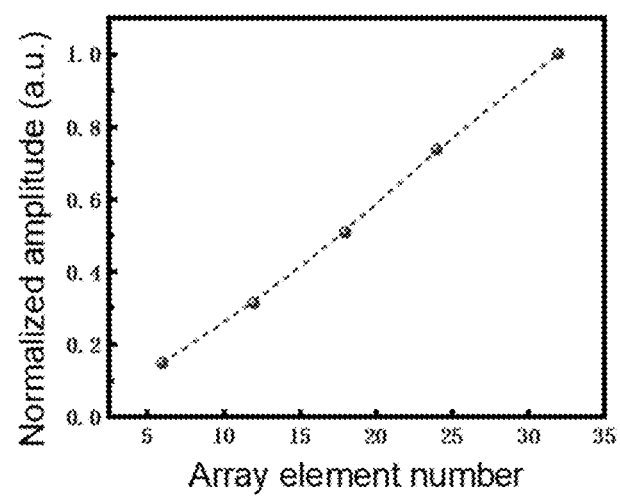
FIG. 6 is a graph showing the relationship between numbers of array elements in an aperture of the phased array ultrasonic transmitting probe and amplitudes of critically refracted longitudinal wave.

The number of array elements in an aperture n of the transmitting probe is set to be 12, 18, 24, and 32 respectively, 6000 m/s is selected as $v_m$ in formula (1), and a delay law of the transmitting probe is calculated according to step 3. Taking the number 32 of array elements in an aperture as an example, the delay time is shown in FIG. 5. When the receiving probe is not delayed, a critically refracted longitudinal wave can be excited and received. A relation curve between the numbers of array elements in an aperture n of the transmitting probe and the amplitudes A of the critically refracted longitudinal waves is obtained, as shown in FIG. 6. The number of array elements in an aperture n is selected to be 24, and the gain of instruments is adjusted to 53 dB. At this time, the amplitude of the received signal is 83%, and the signal-to-noise ratio is 41 dB, which meet the requirements that the amplitude of received signals is not less than 50% of the full screen and the signal-to-noise ratio is not less than 12 dB.

Step 5 Reading and Interpolation of Arrival Time of a Received Signal

Figure 7:
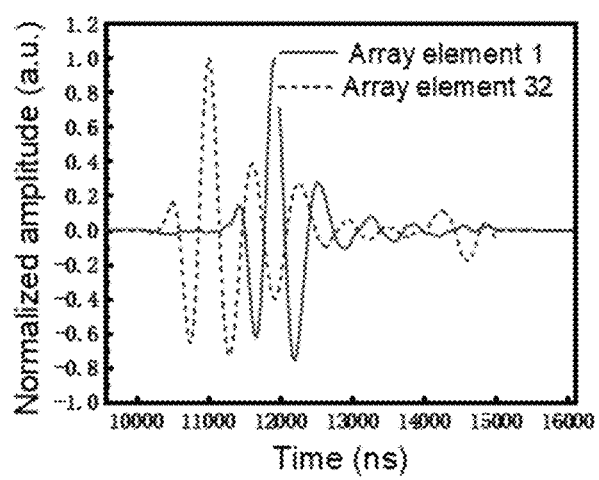
FIG. 7 shows A scan signals of a critically refracted longitudinal wave read by a phased array ultrasonic receiving probe.
Figure 8:
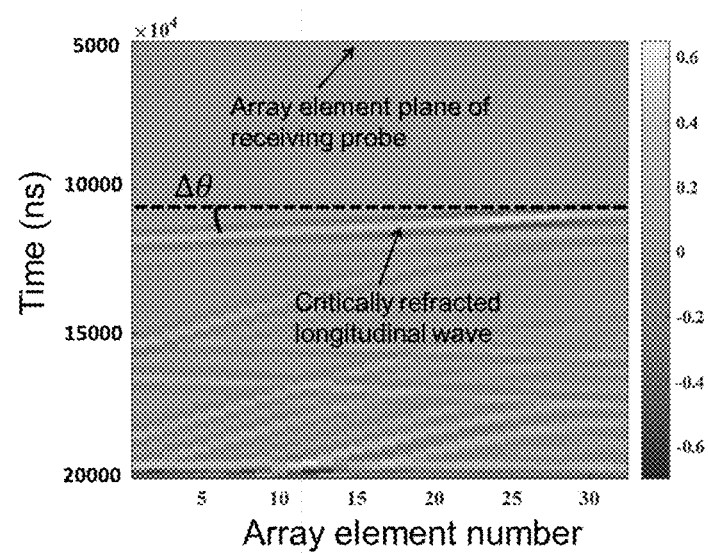
FIG. 8 shows a B scan signal of a critically refracted longitudinal wave read by the phased array ultrasonic receiving probe.

A critically refracted longitudinal wave is excited and received on the basis of the delay law optimized in step 4, and A scan and B scan signals are recorded in the computer at a sampling frequency of 100 MHz. FIG. 7 shows A scan signals corresponding to array elements 1 and 32 of the receiving probe, and FIG. 8 shows a B scan signal of the receiving probe. The A scan signal corresponding to each receiving array element is interpolated, and the time interval between two adjacent points of the signal is 1 ns.

Step 6 Calculation of Ultrasonic Velocity of the Material to be Tested

The A scan signals corresponding to the receiving array elements 1 and 32 in step 5 are selected, and the corresponding time at the maximum amplitudes of the critically refracted longitudinal waves, as shown in FIG. 7, is 11926 ns and 11009 ns respectively. The delay time between the two array elements is $t_{1-32}$=−917 ns. The angle $\Delta\theta$ between the critically refracted longitudinal wave in the B scan signal and the plane of phased array ultrasonic array elements is calculated as −7.73° according to formula (4), as shown in FIG. 8:

$$\Delta\theta = \sin^{-1}\left(\frac{t_{ij} \times v_w}{(j-i) \times P}\right) = \sin^{-1}\left(\frac{-917 \times 2730}{(32-1) \times 6 \times 10^{-4}}\right) = -7.73° \quad (4)$$

According to formula (5), the longitudinal wave velocity of the material to be tested is calculated to be 5866 m/s, and this value is the actual longitudinal wave velocity of the material to be tested.

$$v_m = \frac{v_w}{\sin(\theta_w - \Delta\theta)} = \frac{2730}{\sin(20° + 7.73°)} = 5866 \text{ m/s} \quad (5)$$

Step 7 Optimization of the Delay Law

Figure 9:
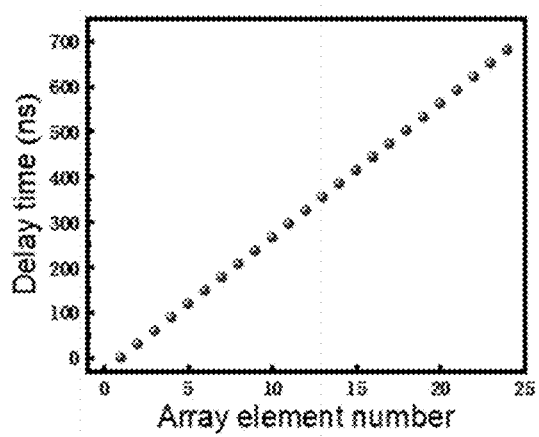
FIG. 9 is a graph showing delay time when the number of array elements in an aperture of the phased array ultrasonic transmitting probe is 24 and the longitudinal wave velocity setting value is 5866 m/s.

The actual longitudinal wave velocity calculated in step 6 is set as $v_m$ in formula (1) in the calculation principle of the delay law, the longitudinal wave velocity of the material is set to be 5866 m/s in the phased array ultrasonic-based inspection system of critically refracted longitudinal wave in step 2, and the number of array elements in an aperture n is set to be 24. Step 3 is repeated, and the calculated optimal delay law is as shown in FIG. 9. The gain is adjusted to 53 dB, the amplitude of the corresponding critically refracted longitudinal wave signal is 80% of the full screen, and the signal-to-noise ratio is 38 dB, thereby realizing high-quality excitation and reception of critically refracted longitudinal wave on the material to be tested and laying a foundation for defect inspection and damage evaluation.

What is claimed is:

1. A multi-material sound velocity measurement method of critically refracted longitudinal wave based on single-angle wedges, wherein a phased array ultrasonic law is calculated and optimized, the arrival time of a received signal is read and interpolation is performed, and a critically refracted longitudinal wave velocity of a material is calculated, the method including the steps of:

(1) preliminarily calculating a phased array ultrasonic delay law preliminarily selecting a number of array elements in an aperture n according to the ultrasonic attenuation coefficient of the wedges, giving a longitudinal wave velocity $v_m$ value, calculating a corresponding first critical angle $\alpha_I$ by formula (1), and calculating a phased array ultrasonic incident deflection angle $\theta$ by formula (2) according to the angle of the wedges:

$$\theta = \alpha_I - \theta_w \quad (2)$$

then, calculating a delay law of the phased array ultrasonic transmitting probe by formula (3):

$$\begin{cases} t_i = \dfrac{(i-I) \times P \times \sin\theta}{V_w} & \theta > 0 \\ t_i = \dfrac{(J-i) \times P \times \sin(-\theta)}{V_w} & \theta < 0 \end{cases} \quad (3)$$

where i is a serial number of any aperture array element, I is a serial number of an initial aperture array element, J is a serial number of a final aperture array element, I≤i≤J≤n (i, I, J, and n are all positive integers), $t_i$ is a delay time of the i-th array element, and P is a spacing between array elements;

(2) optimizing the calculated delay law selecting a certain value from 5% to 10% in a longitudinal wave velocity range of the to-be-measured material as a step, setting the longitudinal wave velocity $v_m$ of the to-be-measured material in sequence from low to high in the phased array ultrasonic inspection system, and exciting and receiving a critically refracted longitudinal wave according to the calculated delay law of the transmitting probe when the receiving probe is not delayed; adjusting a gain of instruments and fixing the gain to a certain value to ensure that a maximum amplitude in the received signals is not less than 80% of a full screenland does not exceed the full screen; building a relation curve between longitudinal wave velocities $v_m$ of the material and amplitudes A of critically refracted longitudinal waves, fitting and determining a $v_m$ corresponding to the maximum A;

setting different numbers of array elements in an aperture n, obtaining a relation curve between the numbers of array elements in an aperture n of the transmitting probe and the amplitudes A of the critically refracted longitudinal waves by exciting and receiving a critically refracted longitudinal wave according to the calculated delay law of the transmitting probe when the receiving probe is not delayed; selecting a number of array elements in an aperture n according to quality of the received signals, adjusting the gain of instruments, and determining an optimized delay law to ensure that the amplitude of the received signals is not less than 50% of the full screen, and a signal-to-noise ratio is not less than 12 dB;

(3) reading and interpolating the arrival time of a received signal exciting and receiving a critically refracted longitudinal wave on the basis of the optimized calculated delay law, and recording A scan and B scan signals in the computer at a sampling frequency of not less than 50 MHz; performing linear interpolation on the A scan signal corresponding to each array element, to ensure that a sampling frequency is not less than 500 MHz;

(4) calculating the longitudinal wave velocity of the material to be tested calculating a delay time $t_{ij}$ between two array elements in the aperture used by the receiving probe by reading and interpolating the arrival time of a received signal, and calculating an angle $\Delta\theta$ between the critically refracted longitudinal wave and a plane of phased array ultrasonic array elements in the B scan in step (5) by formula (4):

$$\Delta\theta = \sin^{-1}\left(\frac{t_{ij} \times v_w}{(j-i) \times P}\right) \quad (4)$$

calculating the longitudinal wave velocity $v_m$ of the material to be tested according to the solved $\Delta\theta$ by formula (5):

$$v_m = \frac{v_w}{\sin(\theta_w - \Delta\theta)} \quad (5)$$

(5) calculating an optimal delay law further repeating the preliminary calculation of the phased array ultrasonic delay law on the basis of the calculated longitudinal wave velocity $v_m$ of the to-be-measured material, and calculating to obtain the optimal delay law so that high-quality excitation and reception of critically refracted longitudinal wave based on single-angle wedges on the to-be-measured material is enabled to inspect defects and evaluate damages.

* * * * *